United States Patent [19]

Abe et al.

[11] Patent Number: 4,495,017
[45] Date of Patent: Jan. 22, 1985

[54] PROCESS FOR CONTINUOUS PRODUCTION OF PREPREG SHEETS

[75] Inventors: Yasuaki Abe, Takarazuka; Mikio Hayashi, Kawanishi; Kousaku Asagi, Ibaraki; Akira Morii, Takatsuki; Kazutoshi Fujimura, Nishinomiya, all of Japan

[73] Assignee: Sumitomo Chemical Company, Ltd., Osaka, Japan

[21] Appl. No.: 478,880

[22] Filed: Mar. 25, 1983

Related U.S. Application Data

[63] Continuation of Ser. No. 302,356, Sep. 15, 1981, abandoned.

[30] Foreign Application Priority Data

Sep. 18, 1980 [JP] Japan .................... 55-130191
Jun. 26, 1981 [JP] Japan .................... 56-100344

[51] Int. Cl.³ .................... B32B 5/02; D04H 3/08
[52] U.S. Cl. .................... 156/181; 427/299; 427/434.4
[58] Field of Search .............. 156/181, 180, 441, 179, 156/324, 314; 427/434.4, 434.6, 302, 299; 118/60

[56] References Cited

U.S. PATENT DOCUMENTS

| | | | |
|---|---|---|---|
| 3,460,978 | 8/1969 | Clayton et al. | 427/434.6 |
| 3,629,028 | 12/1971 | McLarty et al. | 156/175 |
| 3,737,352 | 6/1973 | Avis et al. | 156/181 |

Primary Examiner—Michael Ball
Attorney, Agent, or Firm—Wenderoth, Lind & Ponack

[57] ABSTRACT

The present invention relates to a process for the continuous production of prepreg sheets unidirectionally arranged in parallel which involves contacting a plurality of fiber bundles arranged unidirectionally in parallel with each other with a solvent and continuously taking up the individual fiber bundle units under tension over curved surfaces of spreader bodies, such as cylinders while in a wet state, thereby spreading out said fiber bundles over the curved surfaces by means of said tension and subsequently drying the thus-spread out fibers. The invention also contemplates impregnating the dried fiber bundles with a specified quantity of molten resin to prepare the final prepreg resin-containing sheets. According to applicants' method, the fiber bundles are spread with a solvent prior to being impregnated with a resin and this method greatly decreases the frictional resistance between the fiber bundles and the curved surfaces making it possible for the fiber bundles to be spread out by only using a slight tension.

10 Claims, 3 Drawing Figures

FIG. 1
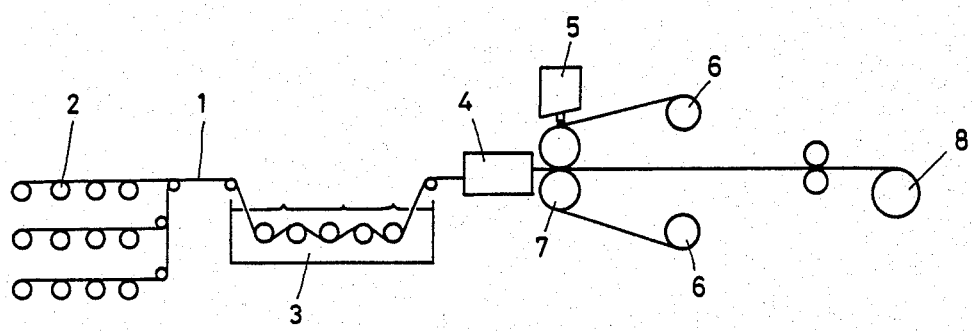
FIG. 2 (1)   FIG. 2 (2)
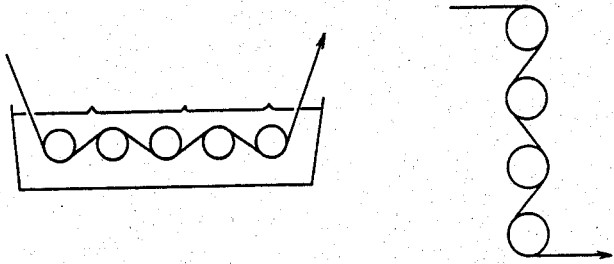
FIG. 3
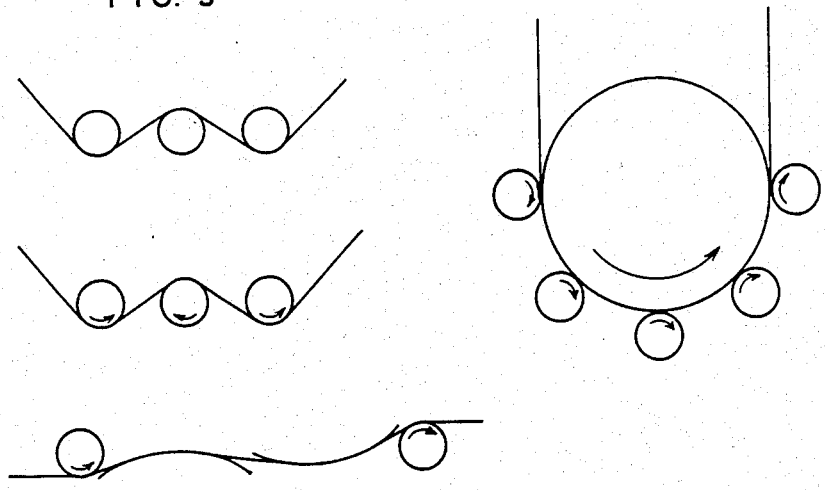

PROCESS FOR CONTINUOUS PRODUCTION OF PREPREG SHEETS

This is a continuation of application Ser. No. 302,356, filed Sept. 15, 1981 abandoned.

The present invention relates to a process for continuous production of prepreg sheets unidirectionally arranged in parallel (hereinafter abbreviated as prepreg sheets) used for fabricating material of fiber-reinforced plastics and having a uniform thickness, with few defects in appearance such as pilling, fluff, gaps, fish eyes, etc., said process being particularly suitable for producing thin prepreg sheets, and to a process for continuous production of fiber-bundle sheets unidirectionally arranged in parallel (hereinafter abbreviated as fiber-bundle sheets). The present invention also relates to a process for continuous production of prepreg sheets having various advantages in the quality of fabricated articles obtained, owing to no use of a solvent upon impregnating the fiber bundles with a resin.

Up to the present, prepreg sheets have been produced by wetting or impregnating fibrous base materials such as fiber bundle piles, woven fabrics, non-woven fabrics, mats, sheets of paper, etc. with a solution of a resin such as epoxy resin, unsaturated polyester resin, phenol resin, etc. dissolved in a volatile solvent such as acetone, methyl ethyl ketone, methyl cellosolve, dimethylformamide (DMF), toluene, methanol, etc., and removing the solvent from the impregnated fibrous base material by heating.

However, since a volatile organic solvent is used for producing prepreg sheets, the sheet is heated over a relatively long time for solvent removal in the drying step. This makes difficult for the resin to maintain uniform B-stage characteristics, and therefore the fluidity characteristics of the resin in the prepreg sheet is not constant, which in turn makes the process control very difficult. A further important problem is that the solvent in not completely removed and remains, even at the termination of the production process. Heating for a long time for complete removal of the solvent results in curing of the resin, and this obstructs the attainment of the B-stage. Also, drying at a low temperature greatly lowers the productivity.

Furthermore, the existence of the so-called solvation phenomenon between the resin and solvent makes it impossible to remove the solvent completely from the prepreg sheet. Thus, the solvent remaining in the prepreg sheet is to be regarded as an essential defect caused by the solvent impregnation process. The solvent remaining in the prepreg sheet volatiles upon heating in the fabricating step to bring about a foaming phenomenon which causes voids in the sheet. Such voids not only lower various physical properties such as mechanical properties, electric properties, resistance to chemicals, etc. but also remarkably lower the fatigue resistance, thus impairing the trustworthiness of the products. As stated in the above, because of the remaining solvent the conventional solution impregnating process represents various defects in the quality of the fabricated products obtained.

On the other hand, as opposed to the above-mentioned solution impregnating process, there have been proposed dry processes for the production of prepreg sheets, including a process wherein a quantity of a powder or paste of a resin composition is sprayed or coated on a fibrous base material and is heat-melted to impregnate the base material, a process wherein a prescribed quantity of a molten resin coated on a release paper, or a molten resin previously formed into a film of a prescribed thickness, while being heated, is impregnated into a fibrous base material, etc. In such a dry process, since no solvent is used at all, the problems resulting from solvents as in the solution impregnating process are almost eliminated. However, since the resin impregnated into the fibrous base material is the resin itself free from solvent, it is a very viscous liquid, though it has a certain degree of fluidity at the impregnation temperature. Therefore, various difficulties are encountered in order that the fibrous base material is impregnated uniformly and completely with the resin. That is to say, even if it is possible to apply the resin uniformly in the width direction onto a plurality of fiber bundle piles arranged parallel in contiguous side-by-side relation, it is not easy to apply the resin uniformly onto every unit of the fiber bundles. Moreover, any attempt to impregnate the fiber bundles uniformly and completely with the resin applied will be unsuccessful, resulting in non-uniformity of resin distribution and insufficiency in impregnation, because of an overwhelmingly high viscosity of the resin in comparison with the case of the solution impregnation process, even though the viscosity will be lowered to some degree by heating. One may think of a process wherein a plurality of fiber bundle piles are caused to pass through a bath of a molten resin, or wherein a prescribed quantity of a resin is transferred onto the fiber bundles from a roll, for example, which holds said quantity of the resin. However, when the fiber bundles are caused to pass over a roll or a guide in order to apply the viscous resin to impregnate them, there will be a tendency for fiber filaments to wind around the roll or guide. This causes defects in appearance such as fluff, pilling, etc. and also exhibits disadvantages such as for example, a shutdown of the production operation. Also, the solution impregnating process represents similar disadvantages, though there may be differences in their degree.

Therefore, in the dry processes for producing prepreg sheets, in order to make the resin distribution uniform and not to cause an insufficiency in impregnation, or to lessen the defects in appearance, such as fluff, pilling, gaps, fish eyes, etc., it is necessary to spread the fiber bundles sufficiently before impregnation and to apply a prescribed quantity of the molten resin for impregnation. Particularly, in the case of producing thin prepreg sheets, it is an indispensable requisite to spread out the fiber bundle sufficiently beforehand.

However, in the conventional dry processes, in order to avoid the adverse effects by solvents, the molten resin is impregnated into the fiber bundles after they have been spread out to some degree by making them pass through and in contact with a plurality of parallel bars or rotary rollers, alternately. But, in such a method, a large frictional resistance is produced between the fiber bundles and the bars, rollers, etc., and therefore in order to spread them out to a desired width, it is necessary to make them pass over and through a large number of bars and rollers, which requires a considerable tension. This damages the fiber bundles to a great extent and causes such defects as fluff, pilling, fish eyes, etc. to prepreg sheets. Also, there are cases in which it is impossible to obtain a spread width necessary for the production of thin prepreg sheets.

Thus, in various dry processes which have been heretofore proposed, emphasis has been laid on resin application; namely, impregnation with molten resin has been carried out while unimpregnated fiber bundles have been insufficiently spread out, and at the same time with or subsequent to the impregnation step, the fiber bundles have been spread out to the final width of the prepreg sheet. For the impregnation of a viscous resin into the fiber bundles, it is preferable to lower the viscosity by heating the resin. Impregnation with a solution of high viscosity is liable to cause an insufficiency or unevenness of impregnation. On the other hand, to spread out fiber bundles impregnated with resin, it is necessary to use a resin solution with a viscosity increased to some degree, because unless such a resin solution is used, only the resin will migrate through the prepreg sheet and exude therefrom, and it will be impossible to obtain a prepreg sheet in which the resin is distributed uniformly.

In order to produce a thinner prepreg sheet, it is necessary to spread out the fiber bundles to a width several times the original bundles. However, this is not only difficult but also disorders the parallel arrangement of the fiber bundles, thus causing gaps, yarn disorder, etc.

As explained above, in the dry processes eliminated from the adverse effects due to solvents, the molten resin itself before the impregnation step has a high viscosity, so that in the impregnation step and in the subsequent spreading step, an unevenness of resin distribution takes place and also there occur defects (gaps, yarn disorder) in the appearance of the prepreg sheet produced.

In the light of the above-mentioned, we studied intensively according to the dry processes eliminated from the adverse effects due to solvents, to obtain a process for continuous production of prepreg sheets which have a constant thickness and are eliminated from the defects such as fluff, pilling gaps, yarn disorder, etc. without causing any insufficiency in resin impregnation and without any unevenness in fiber distribution. As a result, we have found the process of the present invention.

The present invention relates to a process for continuous production of fiber bundle sheets which comprises the step of spreading out a plurality of fiber bundles unidirectionally arranged in parallel with one another, in a solvent or in a wetted state with a solvent, by continuously taking off said fiber bundles while applying tension on them in contact along curved surfaces of spreader bodies having at least a part of the curved surface of a column or cylinder, and the step of drying the fiber bundles thus spread out; and to a process for continuous production of prepreg sheets unidirectionally arranged in parallel which comprises the step of impregnating the thus continuously obtained dried fiber bundle sheets with a prescribed quantity of a molten resin.

In comparison with the spreading method carried out in the conventional dry processes, the spreading of the fiber bundles, in a solvent or in a wetted state with a solvent, while applying tension as in the process of the present invention, makes the fiber bundles to be continuously spread out by being pressed under yarn tension on the curved surfaces of the spreader bodies, and at the same time dissolves the sizing agent applied to the fiber bundles and releases the binding force. Moreover, the spreading of the fiber bundles in a solvent or in a wetted state with a solvent makes the frictional resistance between the fiber bundles and the curved surfaces of the spreader bodies extremely small. This not only makes it possible for the fiber bundles to be spread out to a desired spread width by only a slight tension in slight contact along only few number of the curved surfaces of the spreader bodies, but also restrains the damage of the fiber bundles to a slight extent. The spread width of the fiber bundles varies depending on the content of the sizing agent in the fiber bundles, the diameter, number, type of combination, spatial arrangement, surface finish, material, condition of contact with the fiber bundles (whether the spreaders are of fixed type or of free rotation type), take-off tension, take-off speed, etc. of the spreader bodies having at least a part of the curved surface of a column or cylinder. Therefore, the spread width cannot be specified definitely, but it is necessary to select it, giving consideration to the balance between the spread width and the damage of the fiber bundles. Thus, the spread width per fiber bundle is not particularly specified, but in the case of continuous production of prepreg sheets, it is preferable to spread out the unit fiber bundle by more than 50%, if possible more than 100%, based on the fiber distribution quantity corresponding to the final width and thickness of the desired prepreg sheet. Spreading again at a considerable ratio per unit fiber bundle after impregnation with a molten resin, is liable to cause defects, such as gaps, yarn disorder, etc., in the prepreg sheet produced, and also unevenness in the distribution of the resin and fiber. Therefore, it is desirable to spread out the fiber bundles before impregnation with the molten resin.

On the other hand, in the case of continuous production of fiber bundle sheets and also in the continuous production of prepreg sheets, spreading of a unit fiber bundle by more than 100% based on the quantity of fiber distribution corresponding to the final width and thickness of the desired fiber bundle sheet and prepreg sheet, is effective in producing fiber bundle sheets and prepreg sheets having no gaps and strengthened in the binding force between the fiber bundles, by pilling up a part of the spread unit fiber bundle over another and finally obtaining a desired width and thickness. After determining the position of a plurality of fiber bundle files arranged unidirectionally in continuous relation and in parallel with one another, every other one of unit fiber bundles are separated, and each fiber pile, in a solvent or in a wetted state with a solvent, is continuously taken over while being applied with tension in contact along curved surfaces of spreader bodies having at least a part of the curved surface of a column or cylinder, whereby the unit fiber bundle is spread out by more than 100% based on the quantity of fiber distribution corresponding to the final width and thickness of the desired fiber bundle sheet an prepreg sheet (but it is necessary to make a width less than 200% so that the unit fiber bundles do not contact with each other) and thereafter by pilling up one fiber bundle over another, a gap-free fiber bundle sheet can be produced. As a practical method of pilling fiber bundles, the following is also effective: a plurality of fiber bundles are spread out in contact along the curved surfaces of the same spreader bodies up to less than 100%, then every other one of unit fiber bundles are separated and are spread out more than 100% in contact along the curved surface of another spreader body or along the front and back sides of the curved surfaces of the same spreader bodies and thereafter the fiber bundle piles are piled up over one another.

The following procedure is also included in the process of the present invention and brings about very effective results: after the sizing agent applied on the original fiber bundles is removed while the fiber bundles are in a solvent or in a wetted state with a solvent, the fiber sizing are further immersed into a solution of the sizing agent or sprayed with said solution, in order that the spread fiber bundles will maintain the spread condition, and thereafter the fiber bundles are sufficiently heated and dried to remove the solvent so as to fix the fiber bundle sheet. Another effective and practical procedure is to use a solution of a sizing agent dissolved in the solvent used in the spreading step. The Quantity of dissolution of the sizing agent is not particularly specified, but a solution generally less than 20 weight % is preferable.

The fiber bundles used in carrying out the process of the present invention are those composed of a large number of single filaments, and preferably they are yarns or tows composed of bundles of continuous long filaments. For example, they include organic fibers such as fibers of polyamide, polyester, polyacrylonitrile, polyvinyl alcohol, etc.; organic heat-resistant fibers such as fibers of aromatic polyamide (for example, Kevler ® (Dupont, U.S.), polyfluorocarbon, phenol resin (Kynol ®; Carbonrandam, U.S.), polyamide-imide, polyimide, etc.; rayon and natural fibers; inorganic fibers such as fibers of glass, boron nitride, carbon (including carbonaceous, graphitized, and flame-resisting fibers), silicon nitride, silicon carbide, alumina, zirconia, asbestos, etc.; metal fibers such as fibers of copper, tungsten alloy, iron, aluminum, stainless steel, etc., composite fibers such as fibers of boron with a core of tungsten, boron carbide with a core of tungsten, silicon carbide with a core of tungsten, boron, etc. and all others having a form of fiber. It is also possible to use fiber bundles composed of a combination of two or more of the above-mentioned fibers.

The solvents used in the present invention include ketones such as acetone, methyl ethyl ketone; alcohols such as methyl alcohol, ethyl alcohol, isopropyl alcohol, etc.; ethers such as ethyl ether, methyl isopropyl ether, tetrahydrofuran, etc.; halogenated hydrocarbons such as methylene chloride, chloroform, etc.; hydrocarbons such as toluene, xylene hexane, heptane, etc.; dimethylformamide, dimethylacetamide, dimethyl sulfoxide, etc., and there is used one selected therefrom or a mixture of two or more thereof.

As the sizing agents mainly used, there can be mentioned thermosetting resins such as epoxy resins, unsaturated polyester resins, vinyl resins, phenol resins and various modified phenol resins, melamine resins and various modified melamine resins, polyurethane resins, polyvinyl alcohol and polyvinyl butyral resins, polyamide-imide resins, polyimide resins, silicone resins (including various silane coupling agents), diallyl phthalate, etc. and the raw material resins or low molecular products of the above-mentioned resins. It is also possible to use thermoplastic resins such as polystyrene, ethylene-vinyl acetate copolymer, poly(meth)acrilic acid, poly(meth)acrylic acid esters, polyamide, polycarbonate, polyester, polyethersulfone, polyphenylene oxide, polyphenylene sulfide, etc. and low molecular products of these resins, singly or as a mixture of two or more of the above-mentioned thermosetting resins.

As the molten resins used in the process of the present invention, it is possible to use thermosetting resins such as epoxy resins, melamine resins, polyurethane resins, polyvinyl alcohol and polyvinyl butyral resins, polyamide-imide resins, polyimide resins, silicone resins, diallyl phthalate resins, etc. or thermoplastic resins such as polyethylene, polypropylene, polystyrene, ethylene-vinyl acetate copolymers, polyvinyl chloride, poly(meth)acrylic acid, poly(meth)acrylic acid esters, polyamide, polycarbonate, polyester, polyether sulfone, polyphenylene oxide, polyphenylene sulfide, etc., singly or as a mixture of two or more of them.

Additionally, it is desirable that the fiber bundles arranged unidirectionally and in parallel with one another are determined for their position by previously making said fiber bundles pass through a comb-like article placed for positioning said fiber bundles within a width corresponding to the final width of the sheet.

The spreader bodies having at least a part of the curved surface of a column or cylinder are solid or hollow columns or cylinders, and also a part of a curved surface cut off from a column or cylinder of a large diameter may be used. The material is not particularly specified, but it is preferable to select one which has a small frictional coefficient and is not extremely deformed or abraded by the friction with the fiber bundles. Usually, stainless steel is used, but a spreader body made of a metal covered with a synthetic resin such as teflon, etc., iron, copper, etc. and inorganic substances such as glass, alumina, etc. can be mentioned. The diameter, number, type of combination and spatial arrangement are selected considering the balance between the spread width and the damage of the fiber bundles, and therefore they can not be determined definitely, but for fiber bundles having a high modulus of elasticity, spreader bodies with a large diameter are used, and it is desirable that the number, type of combination and spatial arrangement of the spreader bodies should be selected taking account of the contact length between the fiber bundles and the curved surfaces, and the pressing force against the spreader bodies caused by the taking-over tension. The type of spreader bodies (whether they are of fixed type or free rotation type, or whether they are of driving type which drives giving a differential peripheral speed in the travelling direction of the fiber bundles or of vibration type which vibrates in the travelling direction of the fiber bundles or perpendicular to the travelling direction) exerts a great influence on the spreading effects (the spread width and damage of the fiber bundles). Namely, in the case of fixed type, the spread width becomes large but the damage also becomes relatively large; in the case of free rotation type, the damage is slight but the spread width is small. Other types bring about results in conformity with the above-mentioned types. Therefore, in carrying out the process of the present invention, it is desirable, taking the above-mentioned effects into consideration to use the fixed type, free rotation type, driving type, and/or vibration type, singly or in combination of two or more types. Furthermore, the take-over tension and take-over speed of the fiber bundles should be, of course, uniform in order that any disorder of the fiber bundles does not occur, and they are selected in relation with the spreading-out effects.

The step of drying the spread fiber bundles is a very important step. The process of the present invention is based on the dry system prepreg sheet production process from which have been eliminated the previously mentioned disadvantages due to solvents. Therefore, it is essential that the solvent should not remain at all in the sheet produced, by drying the spread fiber bundles completely. The method of drying is not particularly specified, but in order to reduce the disorder of the spread fiber bundles and the generation of fluff, and to prevent the spread fiber bundles from being gathered again by the cohesive force due to the solvent, it is preferable to dry the bundles by putting them in contact along heated drum drier bodies rather than to use the ventilation type.

Application and immersion with a molten resin can be easily attained by adapting conventional methods.

For example, there can be mentioned a method wherein the resin is applied beforehand with an air doctor coater, blade coater, rod coater, knife coater, squeeze coater, impregnation coater, etc. used in various coating apparatus and film production apparatus, and the resin is regulated to a definite quantity before and after impregnation; and a method wherein a definite quantity of the resin is applied with an extrusion coater, calender coater, spray coater, cast coater, kissroll coater, gravure coater, transfer roll coater, reverse roll coater, etc. and is caused to impregnate. The resin may be directly applied to the spread fiber bundles, or may be indirectly applied beforehand to a sheet of release paper, and then it is transferred to the spread fiber bundles, or resin formed previously into a film may be applied to the spread fiber bundles while melting it by heating. All these procedures give good results.

The method of impregnation is not particularly specified, and it can be easily attained by combined use of a heated roll and a heated press.

The invention will be explained in more detail as follows by referring partly to the accompanying drawings wherein:

FIG. 1 is a flow chart explaining a mode of practice of the continuous production of a unidirectionally arranged prepreg sheet of the present invention; and FIGS. 2 and 3 show arrangements of fiber bundles and spreader bodies for the spreading step which have at least a part of the curved surface of a column or cylinder placed in air.

In these drawings the reference numerals indicate the following members respectively:
1: Fiber bundles
2: Creel
3: Spreading means
4: Drier
5: Resin-supplying means
6: Release paper unwinding means
7: Impregnation rollers
8: Winder
9: Solvent dropping means A mode of practice of the process of the present invention is shown in the flow chart of FIG. 1. A plurality of fiber bundles (1) are supplied continuously under a controlled tension from a plurality of creels (2) through spreading means (3), and are dried sufficiently in a drier (4). A prescribed quantity of a molten resin is supplied from a resin-supplying means (5) onto release paper which is unwound under tension, and the fiber bundles are taken over through heated rolls (7) to a winder (8).

FIG. 2 shows the step of taking over the fiber bundles in a solvent or in a wetted state with a solvent. FIG. 2-(1) shows an example of immersion in a solvent, and FIG. 2-(2) shows an example of uniform wetting of the fiber bundle piles by a solvent dropping means.

FIG. 3 shows examples of the methods of putting the fiber bundles into contact along spreader bodies having at least a part of the curved surface of a column or cylinder. Non-marked circles represent fixed bars, and circles with an arrow mark represent rollers of free rotation type or of driving type.

Main examples of the process for carrying out the present invention have been explained, but of course the invention can be carried out by combining these processes.

The process of the present invention wherein fiber bundles are spread out into a sheet previously, then sufficiently dried, and thereafter impregnated with a molten resin, is not only useful for continuous production of prepreg sheets unidirectionally arranged parallel, but also it is sufficiently possible for the production of sheets for use in sheet-molding compounds (SMC) which carry a unidirectionally arranged prepreg sheet on one side, and also for application to continuous production of round, square or profiled bars, by pultrusion method, which are produced by the same principle of laminating a large number of unidirectional prepreg sheets. The process is also easily applicable to produce laminated sheets which are produced by laminating the unidirectional prepreg sheets at suitable angles, in order to eliminate the anisotrophy of the unidirectional prepreg sheets, and to the production of such laminated prepreg sheets. The process of the present invention is also very effectively applicable to the production of prepreg sheets composed of fabrics of fibrous materials because the process can uniform the impregnation of molten resin, removing the above-mentioned adverse effects of the sizing agents for reducing the damage to the fibers.

In the following, concrete examples of the process of the present invention are shown, but of course the process is not limited to the following examples.

EXAMPLE 1

Twelve bundles of carbon fiber filament yarns (each yarn composed of 6,000 filaments; tensile bundle strength 20.1 kg/yarn; quantity of sizing agent 0.4 weight %) were arranged in parallel with on another through a comb. The thus arranged yarns were introduced into a tub filled with tetrahydrofuran, and were caused to pass alternately through fixed bars, which were perpendicular to the fiber direction and placed in parallel with one another at 20 cm intervals in the tub, so that the yarns could be spread out. The spread yarn piles were put into contact with a ⅔ periphery of a drum drier (diameter 300 mm; heated at 140° C.) and dried, and the yarn piles were then continuously taken over at a speed of 1 m or 8 m/min.

| Take-over speed (m/min) | Number of fixed bars | Difference between take-over tensions ($T_2 - T_1$) (g/yarn) | Spread width per yarn (mm/yarn) | Tensile bundle strength per yarn (kg/yarn) |
|---|---|---|---|---|
| 1 | 5 | 200 | 7.6 | 20.0 |
| 1 | 5 | 1500 | 11.4 | 19.1 |
| 8 | 5 | 200 | 6.7 | 19.8 |
| 8 | 5 | 1000 | 9.6 | 19.3 |

Difference between take-over tensions ($T_2 - T_1$):
$T_1$: tension before entering the first fixed bar
$T_2$: tension after leaving the final bar
Tensile-bundle strength per yarn:
Average value of the tensile strengths of 10 yarns taken-over (span length: 30 cm)

COMPARATIVE EXAMPLE 1

Without using the tub filled with tetrahydrofuran, the same carbon fiber filament yarn as used in Example 1 were made to pass alternately through fixed bars (diameter 12 mm; stainless steel) placed in air perpendicularly to the fiber direction and in parallel with one another at 20 cm intervals, so that the yarn could be spread out, and then the spread yarns were continuously taken over.

| Take-over speed (m/min) | Number of fixed bars | Difference between take-over tensions ($T_2 - T_1$) (g/yarn) | Spread width per yarn (mm/yarn) | Tensile bundle strength per yarn (kg/yarn) |
| --- | --- | --- | --- | --- |
| 1 | 5 | 1000 | 4.5 | 17.1 |
| 1 | 9 | 4500 | 6.3 | 16.8 |
| 8 | 5 | 1000 | 4.4 | 18.0 |
| 8 | 9 | 4500 | 6.5 | 17.6 |

Difference between take-over tensions ($T_2 - T_1$):
$T_1$: tension before entering the first fixed bar
$T_2$: tension after leaving the final fixed bar
Tensile bundle strength per yarn:
Average value of the tensile strengths of 10 yarns taken-over (span length: 30 cm)

EXAMPLE 2

In the same way as in Example 1, twelve bundles of carbon fiber filament yarns (each yarn composed of 6,000 filaments; tensile bundle strength 20.1 kg/yarn; quantity of sizing agent 0.4 weight %) were arranged in parallel with one another through a comb of a 8.2 mm pitch. The thus arranged yarns were introduced into a tub filled with tetrahydrofuran in which had been dissolved 5 weight % of an epoxy resin (Sumitomo Chemical Company, Limited; registered trade mark Sumiepoxy ®ESA-011) composed of a condensation product of bisphenol A and epichlorohydrine. The yarns were made to pass alternately through five fixed bars (diameter 12 mm; stainless steel) which were perpendicular to the fiber direction and placed in parallel with one another at 20 cm intervals in the tub, so that the yarns could be spread out. The yarn piles spread out so as to have no gaps, were put into contact with a ⅔ periphery of a drum drier (diameter 300 mm; heated at 140° C.) and dried, and the unidirectionally arranged sheet having a width of 100 mm was taken over at a speed of 8 m/min to produce a continuous unidirectionally arranged sheet. In this case, the dried yarn piles were caused to travel at 8 m/min on six free rotation rolls (diameter 40 mm; stainless steel) placed at 50 cm intervals, but there was found no substantial disorder of the yarn piles, showing that the effect of the bundling agent was sufficiently exhibited.

EXAMPLE 3

In the same way as in Example 1, twelve bundles of carbon fiber filament yarns (each yarn composed of 6,000 filaments; tensile bundle strength 20.1 kg/yarn; quantity of bundling agent 0.4 weight %) were arranged in parallel with one another through a comb having a 8.2 mm pitch. The thus-arranged yarns were introduced into a tub filled with tetrahydrofuran. In the tub, the yarn files were alternately caused to pass through five fixed bars (diameter 12 mm; stainless steel) which were perpendicular to the fiber direction and placed in parallel with one another at 20 cm intervals, so that the yarns could be spread out. The yarn piles spread so as to have no gaps, were put into contact with a ⅔ periphery of a drum drier (diameter 300 mm; heated at 140° C.) and dried, and the unidirectionally arranged sheet having a width of 100 mm was taken over at a difference between take-over tensions of 12 kg and at a speed of 8 m/min. To this arranged sheet, a definite quantity of an epoxy resin (100 parts of Sumiepoxy ®ELA-128, BF$_3$.MEA 3 PHR) was applied while heating at 80° C., and the sheet was pressed between rolls heated to 100° C. to impregnate the sheet with the resin. In this way, a unidirectionally arranged prepreg sheet having a thickness of 50 microns (the thickness at $V_f = 60\%$ cure) was continuously produced. By laminating unidirectionally and thus produced prepreg sheets, a sample was formed which has dimensions of 120 mm×6 mm×2 mm thick. Its bending strength in the direction of the fiber was 172 kg/mm$^2$, the bending elastic modulus was 11.5 T/mm$^2$, and interlaminar shear strength was 9.1 kg/mm$^2$. The volume content of the fiber at this time was 60%.

What we claim is:

1. A process for the continuous production of prepreg sheets unidirectionally arranged in parallel which consists essentially of contacting a plurality of fiber bundles arranged unidirectionally in parallel with each other with a solvent which may contain up to 5% by weight of a sizing agent and continuously taking up said fiber bundles under tension of 33.33–250 g/1000 filaments over curved surfaces of spreader bodies, while in a wet state with said solvent to spread out said fiber bundles, drying the thus-spread out fibers by contacting them over heated drum drier bodies heated sufficiently to substantially remove all the solvent therefrom, and then impregnating the dried fiber bundles with a predetermined quantity of a molten resin.

2. A process according to claim 1 wherein said fiber bundles, before being wet with said solvent and spread out, contain a sizing agent, and wherein said solvent removes said sizing agent.

3. A process according to claim 1 wherein the curved surfaces of said spread bodies have at least a part of said surface in the form of a column or cylinder.

4. A process according to claim 1 wherein said fiber bundle units are each spread out by more than 50%, based on the final width and thickness of the final prepreg sheet.

5. A process according to claim 1 wherein said fiber bundle units are each spread out by more than 100%, based on the final width and thickness of the final prepreg sheet.

6. A process according to claim 1 wherein said curved spreader bodies are immersed within a solvent and the fiber bundles are introduced into the solvent and contacted with the curved surfaces where they are taken up and spread over said curved surfaces under tension.

7. A process according to claim 1 wherein the curved surfaces are cylinders which rotate while the fiber bundle units are contacted with the cylinders during the spreading of said fiber bundles.

8. A process according to claim 7 in which the solvent does not contain a sizing agent.

9. A process according to claim 8 in which the fiber bundles contain 0.4% of a sizing agent prior to being contacted with a solvent and the sizing agent is removed from the fiber bundles by the solvent.

10. A process according to claim 1 in which the solvent contains 5% of a sizing agent.

* * * * *